US008356003B2

(12) United States Patent
Chen et al.

(10) Patent No.: US 8,356,003 B2

(45) Date of Patent: Jan. 15, 2013

(54) AUTOMATED INTEGRATION OF EVENTS FOR A SURVEILLANCE SYSTEM

(75) Inventors: Pin-Chuan Chen, Taipei (TW); Shu-Fen Lin, Taipei (TW); Chen-Kun Hsu, Taipei (TW); Yu-Huan Wang, Taipei (TW)

(73) Assignee: Chunghwa Telecom Co., Ltd., Taipei (TW)

( * ) Notice: Subject to any disclaimer, the term of this patent is extended or adjusted under 35 U.S.C. 154(b) by 568 days.

(21) Appl. No.: 12/618,869

(22) Filed: Nov. 16, 2009

(65) Prior Publication Data

US 2011/0035348 A1 Feb. 10, 2011

(30) Foreign Application Priority Data

Aug. 4, 2009 (TW) .............................. 98-126145 A

(51) Int. Cl.

| | |
|---|---|
| ***G06F 17/00*** | (2006.01) |
| ***G06F 7/00*** | (2006.01) |
| ***G06F 15/18*** | (2006.01) |
| ***H04N 5/77*** | (2006.01) |

(52) U.S. Cl. ............. 706/47; 706/20; 707/600; 386/226

(58) Field of Classification Search ........................ None
See application file for complete search history.

(56) References Cited

U.S. PATENT DOCUMENTS

| | | | | |
|---|---|---|---|---|
| 8,126,833 | B2 * | 2/2012 | Cobb et al. | 706/46 |
| 2005/0228763 | A1 * | 10/2005 | Lewis et al. | 706/1 |
| 2010/0063949 | A1 * | 3/2010 | Eaton et al. | 706/14 |

* cited by examiner

*Primary Examiner* — Alan Chen

(74) *Attorney, Agent, or Firm* — Pearne & Gordon LLP

(57) ABSTRACT

A system for automated integration of events, configured for use in a building with a network system, includes a plurality of surveillance systems, a processing center connected to the surveillance systems through the network system and a user device connected to the processing center through the network system. The surveillance systems are adapted to monitor various kinds of irregular events occurring in the building and the surroundings thereof and output corresponding event messages through the network system. The processing center receives the event messages in a preset receiving mode and further classifies and analyzes the event messages. The user device allows users to input filtering conditions and enables the processing center to integrate the classified and analyzed event messages according to the input filtering conditions so as to generate composite filtered messages to be displayed on the user device, thereby achieving efficient acquisition and integration of the event messages.

10 Claims, 3 Drawing Sheets

AUTOMATED INTEGRATION OF EVENTS FOR A SURVEILLANCE SYSTEM

BACKGROUND OF THE INVENTION

1. Field of the Invention

The present invention relates generally to systems for automated integration of events, and more particularly, to a system for automatically integrating and processing irregular events occurring in a building and the surroundings thereof.

2. Description of Related Art

Modern buildings, such as high-rise buildings or plants, should be firm and easy to use, and should be managed by means of mechanisms for safe management and convenient services, including but not limited to an access control system for managing employee's or visitor's access to a building, an image sensor system for monitoring whether unusual events or movements occur, an air conditioning monitoring system for adjusting temperature and humidity, and a fire surveillance system for detecting smoke and fire.

Modern buildings can be further furnished with a network system for providing more convenient and safer management measures and services for safety and security systems. For example, by using an image sensor system in combination with a network system, a central management unit, such as a security center or management center, can monitor the internal situation of the building in real-time. As another example, by using an air conditioning system in combination with a network system, the temperature and humidity inside a building can be better controlled. Moreover, as a final example, by using a fire fighting system in combination with a network system, if a fire breaks out, corresponding measures can be timely and rapidly taken to extinguish the fire.

However, there are a variety of management measures and services, and there are also different kinds of system management staff, such as security guards, community managers, and facility attendants. Therefore, if there are frequent staff changes, a delayed reaction to irregular events may occur and adversely affect the service quality and stability. In addition, to perform various management measures and services, the system management staff have to access various systems separately in an intricate, inconvenient, time-consuming, and inefficient manner. Further, if multiple unusual events occur in a building, the system management staff often can only passively receive messages, and thus are likely to miss the correlation between the unusual events. As a result, the unusual events cannot be rapidly and efficiently addressed.

Therefore, providing a system for automated integration of events with a view to achieving efficient acquisition and integration of event messages is highly desirable.

SUMMARY OF THE INVENTION

In view of the above drawbacks, the present invention provides a system for automated integration of events, wherein the system is configured for use in a building and the surroundings thereof with a network system so as to efficiently acquire event messages and classify, analyze and integrate the complicated event messages to thereby bring convenience to users of the system.

The system for automated integration of events of the present invention is configured for use in a building and the surroundings thereof with a network system. The system for automated integration of events comprises: a plurality of surveillance systems for monitoring irregular events occurring in the building and the surroundings thereof and outputting corresponding event messages through the network system; a processing center connected to the surveillance systems through the network system, the processing center receiving the event messages in a preset receiving mode and classifying and analyzing the event messages; and a user device connected to the processing center through the network system, the user device allowing users to input filtering conditions and enabling the processing center to integrate the classified and analyzed event messages according to the input filtering conditions so as to generate composite filtered messages to be displayed on the user device. As a result, users can conveniently perform related management measures and services according to the displayed messages.

In an embodiment of the invention, the processing center comprises at least one network server, and the processing center comprises a rule database for storing rules for event classification and rules for event aggregation analysis. According to the rules for event classification, the processing center classifies the event messages by using a cluster classification method and a balance tree classification method. The processing center can also perform event aggregation analysis of the event messages according to the rules for event aggregation analysis.

In another embodiment, the preset receiving mode is active, passive or semi-active. In the active receiving mode, the processing center digs, out of the surveillance systems, the irregular events detected by the surveillance systems and then enables the surveillance systems to output the event messages to the processing center; in the passive receiving mode, the surveillance systems take the initiative in outputting the event messages to the processing center; and in the semi-active receiving mode, after receiving the event messages output by at least one of the surveillance systems, the processing center digs, out of the other surveillance systems, the irregular events detected by the other surveillance systems and then enables the other surveillance systems to output the event messages to the processing center.

In another embodiment, the surveillance systems include systems such as electric power monitoring systems, security systems, air conditioning monitoring systems, fire fighting systems, access control systems and/or environmental sensing systems that are capable of monitoring the building and the surroundings thereof. The user device is one or more computers or mobile terminals such as a mobile phone or a personal digital assistant. The network system is an Ethernet network, a wireless network, a local area network and/or the Internet. The building is, for example, a high-rise building, a community, a market place, a manufacturing plant or warehouse and/or a self-service store. The irregular events are events related to the building and the surroundings thereof, such as air conditioning events, fire fighting events, personnel management events and/or unusual or otherwise anomalous events.

Compared with the prior art, the system for automated integration of events of the present invention acquires composite filtered messages through a plurality of surveillance systems, a processing center and a user device, thereby achieving efficient acquisition and integration of event messages and facilitating users to perform related management measures and services.

DETAILED DESCRIPTION OF PREFERRED EMBODIMENTS

The following illustrative embodiments are provided to illustrate the disclosure of the present invention, these and other advantages and effects being apparent to those skilled in the art after reading the disclosure of this specification.

Figure 1:
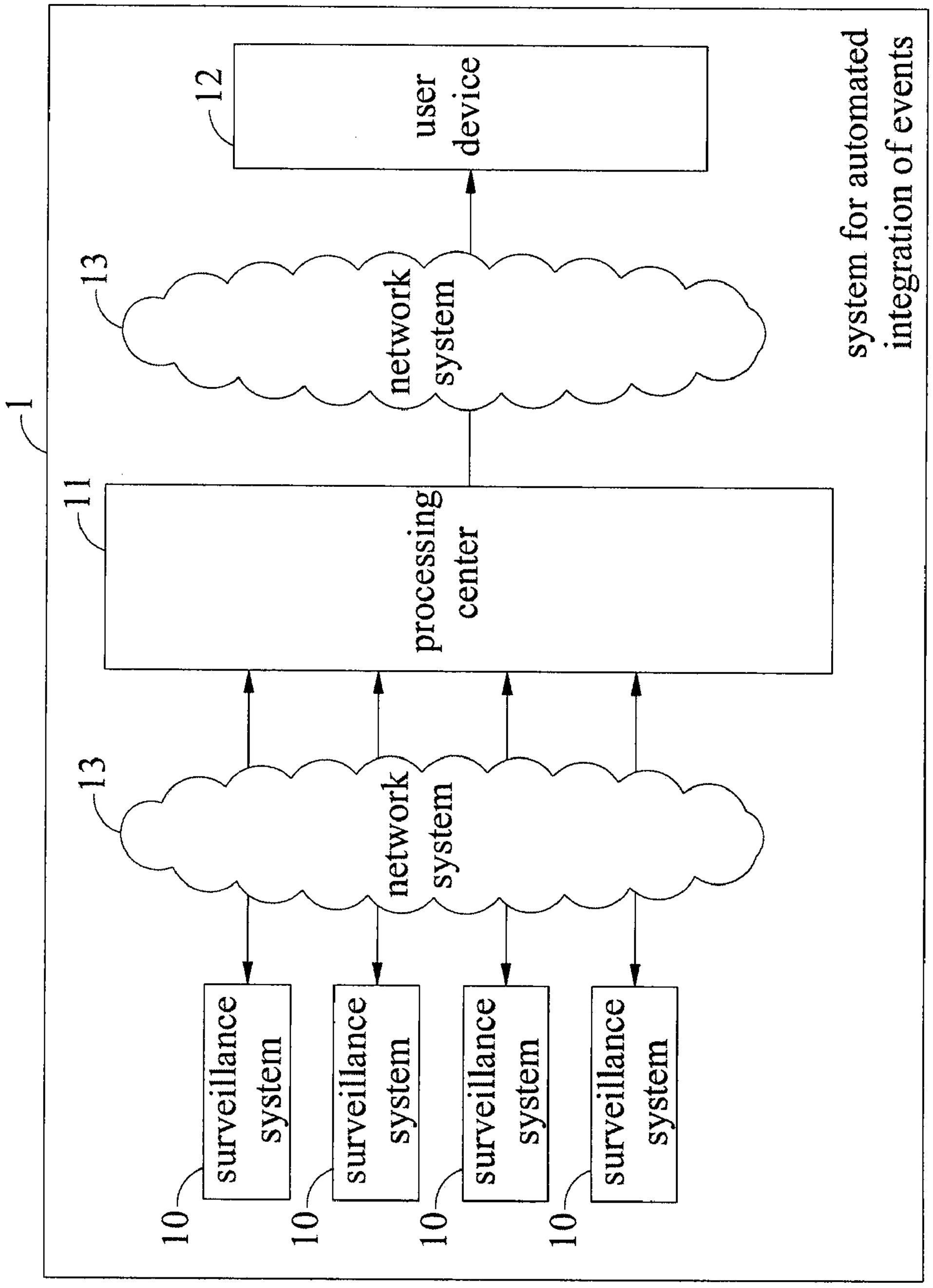
FIG. 1 is a block diagram showing the basic structure of a system for automated integration of events according to an embodiment of the present invention.

FIG. 1 is a block diagram showing the basic structure of a system for automated integration of events according to the present invention. As shown in the drawing, the system 1 for automated integration of events comprises a plurality of surveillance systems 10, a processing center 11, and a user device 12.

The system 1 for automated integration of events is configured for use in a building equipped with a network system 13 and the surroundings of the building. According to a preferred embodiment, the building is, for example, a high-rise building, an apartment, a supermarket, a manufacturing plant or warehouse, and/or a self-service store. The network system 13 is an Ethernet, a wireless network, a local area network and/or the Internet.

The surveillance systems 10 comprise a plurality of surveillance devices (not shown). The surveillance systems 10 monitor different kinds of regular and irregular events occurring in the building and the surroundings thereof (such as air conditioning events, fire fighting events, access control events, or malfunction events) and output corresponding event messages (such as air conditioning event messages, fire fighting event messages, access control event messages, malfunction event messages) to the processing center 11 via the network system 13. Preferably, the surveillance systems 10 are electric power monitoring systems, security systems, air conditioning systems, fire fighting systems, personnel management systems and/or environmental sensing systems capable of monitoring the building and the surroundings thereof. The surveillance systems 10 can further use the surveillance devices to perform corresponding measures.

In practice, a plurality of surveillance systems 10 are provided in the building and the surroundings thereof according to needs of users so as to monitor various kinds of irregular (and regular) events occurring in the building and the surroundings thereof. For example, where electric power monitoring systems and air conditioning monitoring systems are used as the surveillance systems 10 of the present embodiment, the electric power monitoring systems can monitor whether the electric power in the building and the surroundings thereof is stable and the air conditioning monitoring systems can be monitor whether the humidity and temperature in the building and the surroundings thereof are comfortable. Further, where security systems are used as the surveillance systems 10 of the present embodiment, the security systems can monitor whether security events occur (such as, vandalism committed to doors and windows) in the building and the surroundings thereof. Furthermore, where fire fighting systems are used as the surveillance systems 10, the fire fighting systems can monitor whether a fire has broken out in the building. In addition, if personnel management systems are used as the surveillance systems 10, the personnel management systems can monitor staff (and visitor) access to the building. Moreover, if infrared cameras are used as the surveillance systems 10, the infrared cameras can, for example, monitor unusual movement events occurring in the building and the surroundings thereof. Therefore, if the surveillance systems 10 of different functions detect specific kinds of irregular events, they send corresponding event messages through the network systems 13.

The processing center 11 is connected to the surveillance systems 10 through the network system 13 to receive, in a preset receiving mode, the event messages output by the surveillance systems 10 through the network system 13. Further, the processing center 11 classifies and analyzes the received event messages. Preferably, the processing center 11 is a host computer, a network server, or a combination of a plurality of network servers. In addition, the processing center 11 comprises a rule database (not shown) for storing rules for event classification and rules for event aggregation analysis such that the processing center 11 can classify and analyze the received event messages according to the rules for event classification and the rules for event aggregation analysis. In practice, according to the rules for event classification, the processing center 11 classifies the event messages by using a cluster classification method and a balance tree classification method. In particular, the processing center 11 first classifies the event messages into clusters according to the rules for event classification such that the event messages in the same cluster have similar characteristics, and then classifies the event messages in the same cluster in a tree form according to the rules for event classification. For example, each of the rules for event processing can be regarded as a sub-node of the tree map such that the clustered event messages can further be divided.

It should be noted that when the balance tree classification method is used, each of the rules for event classification can be regarded as a sub-node of the tree map and the number of the events assigned to each sub-node is a key value. By averagely assigning a key value to each sub-node, undesirably high tree maps are avoided. In practice, such a method not only reduces the computing load of the processing center 11 (server/host), but also increases the reliability and stability of the system for automated integration of events. Further, the method can be used to set up an execution background or interface for load balancing. Meanwhile, the processing center 11 can analyze the event messages according to the rules for event aggregation analysis.

In a preferred embodiment, the processing center 11 can receive event messages through the network system 13 in an active, passive or semi-active receiving mode. In the active receiving mode, the processing center 11 digs out of the surveillance systems 10 (makes enquiries of the surveillance systems 10 about) the irregular events detected by the surveillance systems 10 and then enables the surveillance systems 10 to output the corresponding event messages to the processing center 11. In the passive receiving mode, the surveillance systems 10 take the initiative in outputting the event messages to the processing center 11. In the semi-active receiving mode, after receiving the event messages output by at least one of the plurality of surveillance systems 10, the processing center 11 digs out of the other surveillance systems 10 (makes enquiries of the other surveillance systems 10 about) the irregular events detected by the other surveillance systems 10 and then enables the other surveillance systems 10 to output event messages to the processing center 11.

The active receiving mode features queries about and ensuing self-initiated investigation into the current situations and circumstances of the building, which accordingly demonstrates a high degree of independence, avoids the transmission of insignificant messages, and enhances the efficiency.

The passive receiving mode features passive receipt of a large number of event messages on the part of the processing center 11 to thereby dispense with resources otherwise required to control its receiving process. In the semi-active receiving mode, when a specific irregular event occurs (only when a specific surveillance system 10 detects an irregular event and sends an event message), the processing center 11 digs out of the other surveillance systems 10 (makes enquiries of the other surveillance systems 10 about) the irregular events detected by the other surveillance systems 10 and then enables the other surveillance systems 10 to output the corresponding event messages to the processing center 11. For example, when a surveillance system 10 (access control system) detects that someone enters the building by swiping in an access card, the surveillance system 10 sends a corresponding event message to the processing center 11. Then, the processing center 11 queries additional surveillance systems 10 for the event messages through the network system 13, thereby facilitating provision of subsequent management measures and services (for example, turning on air conditioning and sensing systems).

The user device 12 is one or more computers or mobile terminals such as a mobile phone or a personal digital assistant, which are connected to the processing center 11 through the network system 13 to allow users to input filtering conditions (for example, filter out event messages related to security). Further, the processing center 11 integrates the classified and analyzed event messages according to the filtering conditions so as to generate composite filtered messages to be displayed on the user device. For example, if the user is a building manager, the filtering conditions can be set to air conditioning events, fire fighting events, or access control events. Accordingly, the processing center 11 can integrate the classified and analyzed event messages into composite event messages related to air conditioning, fire fighting and access control such that the building manager can use the composite circumstantial messages for subsequent management measures and services.

Figure 2:
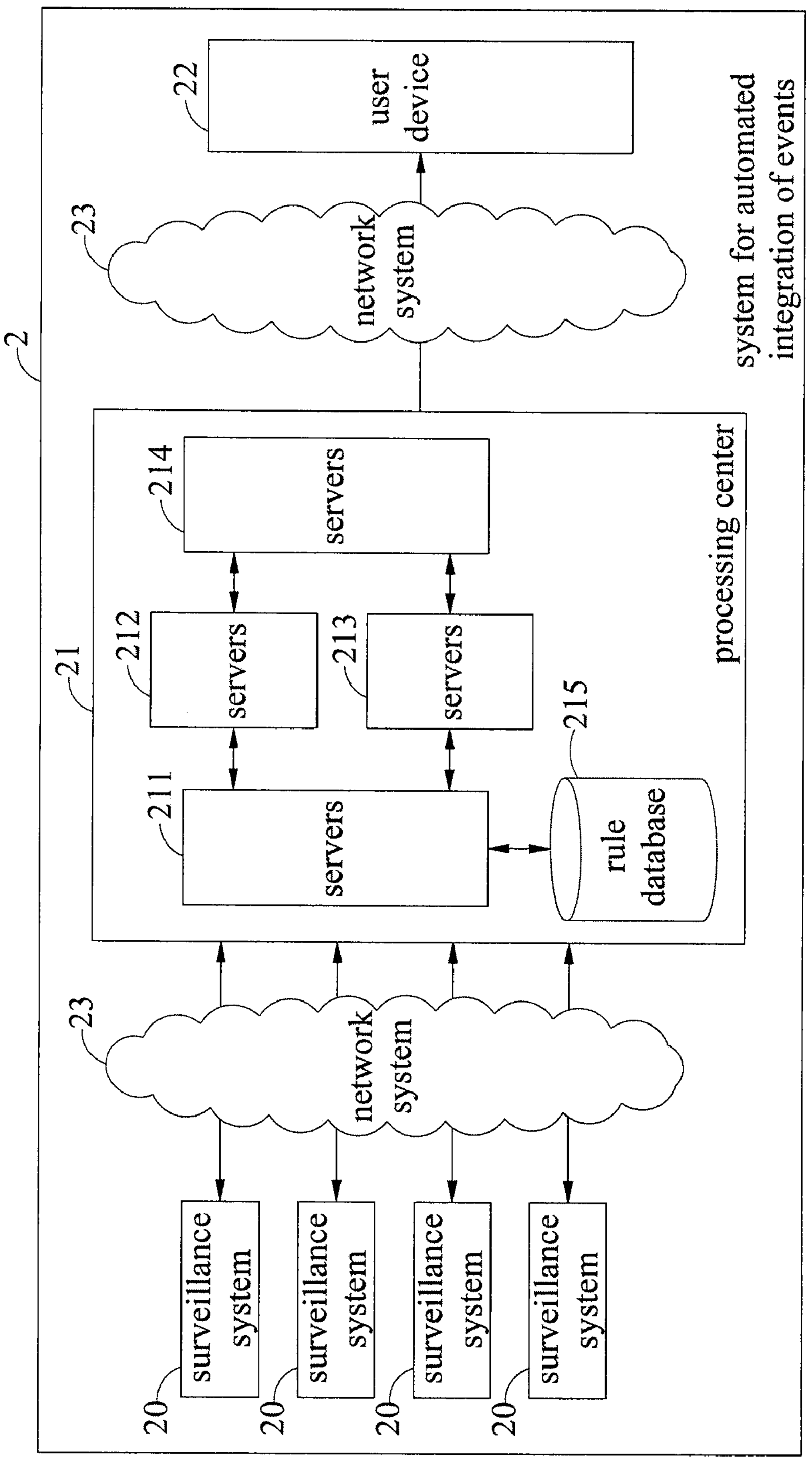
FIG. 2 is a block diagram showing the basic structure of the system for automated integration of events according to another embodiment of the present invention.

FIG. 2 is a diagram showing the basic structure of the system for automated integration of events according to another embodiment of the present invention. As shown in the drawing, the system 2 for automated integration of events comprises a plurality of surveillance systems 20, a processing center 21, and a user device 22.

The present embodiment is similar to the previous embodiment. The difference between the present embodiment and the previous embodiment is that the processing center 11 of the present embodiment comprises a plurality of servers 211, 212, 213, 214 and an event rule database 215. Since the other components and the structure of the present embodiment are the same as those of the previous embodiment, detailed description thereof is omitted herein.

In practice, the server 211 performs initial classification and analysis of the event messages output by the surveillance systems 20 according to the rules for event classification and rules for event aggregation analysis stored in the event rule database 215, and assigns the classified and analyzed event messages to the servers 212, 213 respectively. Then, the servers 212 and 213 perform further classification and analysis of the assigned event messages according to the rules for event classification and rules for event aggregation analysis stored in the event rule database 215, and output the classified and analyzed event messages to the server 214. The event messages stored in the server 214 can be regarded as shared memory data. The server 214 integrates the event messages stored therein according to the filtering conditions input by a user through the user device 22 so as to generate composite filtered messages compatible with the filtering conditions. Then, the composite filtered messages are displayed on the user device 22. The above described analysis and classification methods not only reduce the whole load of the processing center 21, but also increase the processing efficiency and processing speed, and further ensure the stability and reliability of the system 2 for automated integration of events.

Figure 3:
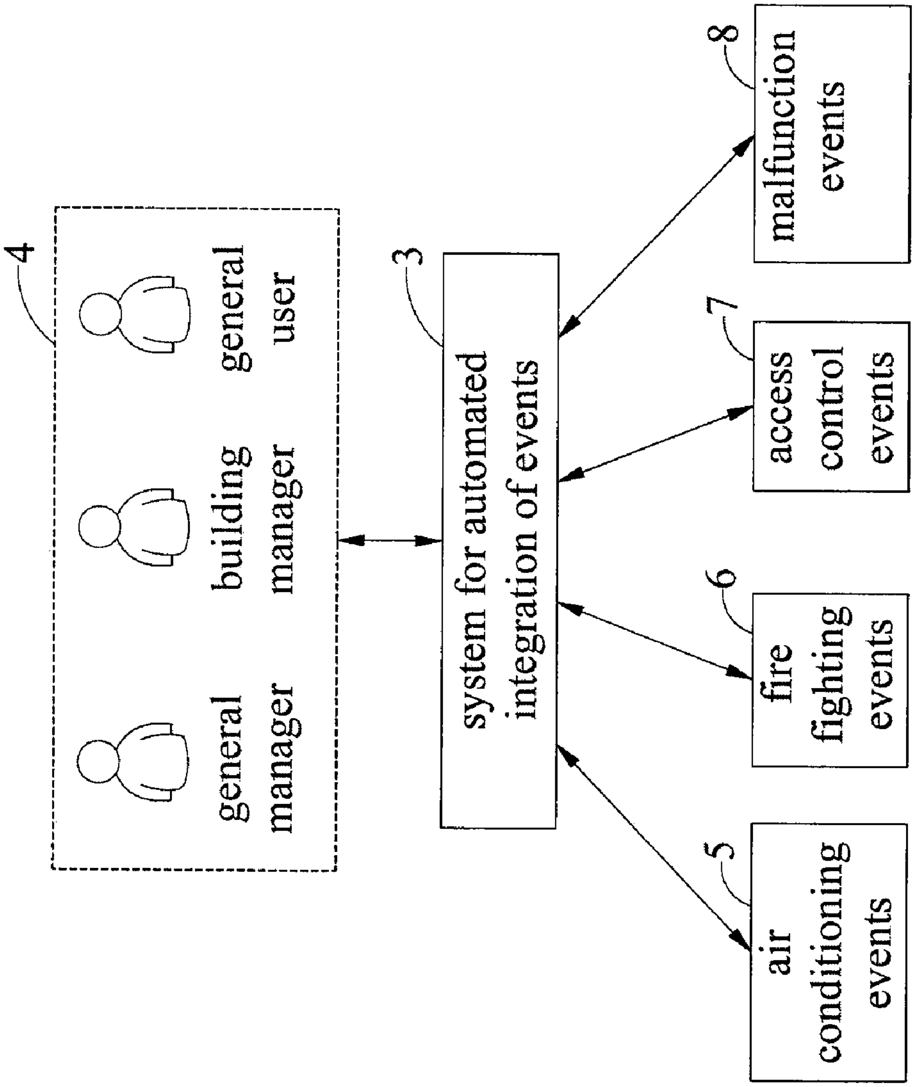
FIG. 3 is a schematic diagram showing the implementation of the system for automated integration of events of the present invention.

Referring to FIG. 3, there is shown a schematic diagram of the implementation of the system for automated integration of events of the present invention. As shown in the drawing, the system 3 for automated integration of events can simultaneously receive air conditioning events 5, fire fighting events 6, access control events 7 and malfunction events 8 so as to provide related information to users 4 (general managers, building managers and general users) such that corresponding management measures and services can be provided. Since the structure of the system 3 for automated integration of events is the same as the systems 1 and 2, detailed description thereof is omitted herein.

In practice, since the system 3 for automated integration of events has characteristics of event decision support, event subscription analysis (filtered messages), event classification and event aggregation analysis, the users 4 can perform management through 'a single window' (the user device), which is relatively simple and convenient and facilitates the users 4 to perform related management measures and services, thereby increasing the management and service efficiency.

Therefore, the system for automated integration of events of the present invention is applied in a building and the surroundings thereof with a network system. The system for automated integration of events comprises a plurality of surveillance systems, a processing center, and a user device. The surveillance systems are adapted to monitor various kinds of irregular (or regular) events occurring in the building and the surroundings thereof, and further output corresponding event messages through the network system. The processing center is connected to the surveillance systems through the network system to receive the event messages according to a preset receiving mode and further classifies and analyzes the event messages. The user device is connected to the processing center through the network system and allows users to input filtering conditions, enabling the processing center to integrate the classified and analyzed event messages according to the input filtering conditions so as to generate composite filtered messages to be displayed on the user device. Therefore, the system for automated integration of events not only achieves efficient acquisition of the event messages, but also detects correlation between different events so as to increase management and service efficiency.

The above-described descriptions of the detailed embodiments are provided to illustrate the preferred implementations according to the present invention and are not intended to limit the scope of the present invention, Accordingly, many modifications and variations completed by those with ordinary skill in the art can be made without departing from the spirit of the invention and should be considered to fall within the scope of present invention as defined by the appended claims.

What is claimed is:

1. A system for automated integration of events, configured for use in a building and surroundings thereof with a network system, comprising:

a plurality of surveillance systems for monitoring irregular events occurring in the building and the surroundings thereof and outputting corresponding event messages through the network system;

a processing center connected to the surveillance systems through the network system to thereby receive the event messages in a preset receiving mode, classify and analyze the event messages, wherein according to rules for event classification, the processing center classifies the event messages by using a cluster classification method and a balance tree classification method; and a user device connected to the processing center through the network system to thereby allow users to input filtering conditions and enable the processing center to integrate the classified and analyzed event messages according to the input filtering conditions so as to generate composite filtered messages to be displayed on the user device.

2. The system of claim 1, wherein the processing center comprises at least a network server.

3. The system of claim 1, wherein the processing center comprises a rule database.

4. The system of claim 3, wherein the rule database stores the rules for event classification and rules for event aggregation analysis.

5. The system of claim 1, wherein the processing center first classifies the event messages into clusters according to the rules for event classification such that event messages in the same cluster have similar characteristics, and then the processing center further classifies the event messages in the same cluster in tree form according to the rules for event classification.

6. The system of claim 4, wherein the processing center performs event aggregation analysis of the event messages according to the rules for event aggregation analysis.

7. The system of claim 1, wherein the preset receiving mode is active, passive or semi-active.

8. The system of claim 7, wherein in the active receiving mode the processing center digs, out of the surveillance systems, the irregular events detected by the surveillance systems and then enables the surveillance systems to output the event messages to the processing center.

9. The system of claim 7, wherein, in the passive receiving mode, the surveillance systems take initiative in outputting the event messages to the processing center.

10. The system of claim 7, wherein, in the semi-active receiving mode, after receiving the event messages output by at least one of the surveillance systems, the processing center digs, out of the other surveillance systems, the irregular events detected by the other surveillance systems and then enables the other surveillance systems to output the event messages to the processing center.

* * * * *